(12) United States Patent
Bao et al.

(10) Patent No.: US 8,885,248 B2
(45) Date of Patent: Nov. 11, 2014

(54) RAMAN AMPLIFIER GAIN COMPRESSION SYSTEMS AND METHODS BASED ON SIGNAL POWER MONITORING

(71) Applicant: Ciena Corporation, Hanover, MD (US)

(72) Inventors: Jun Bao, Ellicott City, MD (US); Balakrishnan Sridhar, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 125 days.

(21) Appl. No.: 13/654,086

(22) Filed: Oct. 17, 2012

(65) Prior Publication Data
US 2014/0104679 A1 Apr. 17, 2014

(51) Int. Cl.
*H01S 3/30* (2006.01)
*H01S 3/102* (2006.01)

(52) U.S. Cl.
USPC .................. 359/334; 359/337.11; 359/341.41

(58) Field of Classification Search
USPC ........ 359/334, 337.1, 337.11, 341.43, 337.41
See application file for complete search history.

(56) References Cited

U.S. PATENT DOCUMENTS

| | | | |
|---|---|---|---|
| 5,963,361 A | 10/1999 | Taylor et al. | |
| 6,049,413 A | 4/2000 | Taylor et al. | |
| 6,057,959 A | 5/2000 | Taylor et al. | |
| 6,204,958 B1 | 3/2001 | Taylor et al. | |
| 6,426,833 B1 | 7/2002 | Bao | |
| 6,525,870 B1 | 2/2003 | Cho et al. | |
| 6,542,287 B1 | 4/2003 | Ye et al. | |
| 6,559,985 B1 | 5/2003 | DeGrange, Jr. et al. | |
| 6,614,589 B2 | 9/2003 | DeGrange, Jr. et al. | |
| 6,678,088 B1 | 1/2004 | Stummer et al. | |
| 6,724,524 B1 | 4/2004 | Evans et al. | |
| 6,734,954 B2 | 5/2004 | Reepschlager et al. | |
| 6,765,659 B1 | 7/2004 | Bhatnagar et al. | |
| 6,885,825 B2 | 4/2005 | DeGrange, Jr. et al. | |
| 6,900,931 B1 | 5/2005 | Sridhar et al. | |
| 6,904,241 B2 | 6/2005 | DeGrange, Jr. et al. | |
| 6,963,681 B2 | 11/2005 | Mao et al. | |
| 7,075,711 B2 | 7/2006 | Haggans et al. | |
| 7,092,148 B1 | 8/2006 | Haggans et al. | |
| 7,206,123 B2 | 4/2007 | Emori et al. | |
| 7,369,300 B2 | 5/2008 | Sridhar et al. | |
| 7,400,443 B1 | 7/2008 | Sridhar et al. | |
| 7,411,727 B2 | 8/2008 | Mongardien | |
| 7,586,671 B2 | 9/2009 | Eiselt | |
| 7,715,092 B2 | 5/2010 | Bolshtyansky et al. | |
| 7,826,748 B2 | 11/2010 | Yang et al. | |
| 7,924,496 B2 | 4/2011 | Eiselt | |
| 8,213,078 B2 | 7/2012 | Hiraizumi | |
| 8,233,215 B2 | 7/2012 | Bao | |

(Continued)

*Primary Examiner* — Mark Hellner
(74) *Attorney, Agent, or Firm* — Clements Bernard PLLC; Christopher L. Bernard; Lawrence A. Baratta, Jr.

(57) ABSTRACT

Raman amplifier gain compression systems and methods based on signal power monitoring are described which estimate distributed Raman amplifier saturation based on a total power measurement at an output of a distributed Raman amplifier and correct for any changes by adjusting the pump power. Since the power measurement, gain estimation, and the pump control and done locally at the Raman amplifier, the duration of any transients is minimized. The systems and methods quickly detect transients on a fiber link using a power monitor in the Raman amplifier, estimate the change in gain due to change in input power from distributed Raman gain, and perform a feedback loop that corrects pump power to eliminate the change in Raman gain locally.

18 Claims, 6 Drawing Sheets

(56) References Cited

U.S. PATENT DOCUMENTS

| | | |
|---|---|---|
| 2006/0139742 A1 | 6/2006 | Frankel et al. |
| 2007/0115537 A1* | 5/2007 | Mongardien ............. 359/334 |
| 2009/0195863 A1* | 8/2009 | Onaka et al. ............. 359/334 |
| 2011/0141552 A1* | 6/2011 | Ghera et al. ............. 359/334 |
| 2012/0327505 A1* | 12/2012 | Fu et al. ............. 359/334 |

* cited by examiner

RAMAN AMPLIFIER GAIN COMPRESSION SYSTEMS AND METHODS BASED ON SIGNAL POWER MONITORING

FIELD OF THE INVENTION

Generally, the field of art of the present disclosure pertains to fiber optic systems and methods, and more particularly, to Raman amplifier gain compression systems and methods based on signal power monitoring.

BACKGROUND OF THE INVENTION

For long-haul fiber optical communication, more and more systems rely on Raman amplification to extend reach in distance and capacity. There are two types of Raman amplifiers: lumped Raman amplifier and distributed Raman amplifier. Lumped Raman amplifiers utilize a dedicated, short length of fiber to provide amplification. The instantaneous gain of the amplifier can be measured by measuring the input and output power and the pump power can be suitably adjusted to keep the gain constant. Distributed Raman amplifiers rely on the transmission fiber as the gain medium. Since the input and output of the transmission fiber are at different locations, it is not feasible to measure the instantaneous Raman gain. The distributed Raman amplifier typically operates in some level of saturation. The saturation depth is a function of the total signal power, which is a function of the span loss and the number of channels. When the channel count changes due to a fiber cut or other disruptions, the gain of the distributed amplifier can change by up 1 or 2 dB. While the change in one amplifier is small, the effect will add up along a chain of amplifiers, resulting in a large change in the channel power. The change in power can cause service outages on the surviving channels until other system control loops are able to measure and re-optimize the channel powers.

Conventionally, Raman amplifier pumps and gain are set at turn-up and are not adjusted after this point. Any variation in channel powers to changes in Raman gain (e.g., due to transients) are handled by adjusting other discrete amplifiers including erbium doped fiber amplifiers (EDFAs) over a fiber link as well as any gain equalizers in the fiber link. This control relies on distributed measurement across the fiber link and is very slow (e.g., 10s to 100s of seconds). Also, existing systems are not Raman rich, so changes in gain in a few Raman amplifiers can be tolerated by absorbing the penalty in the system margin. Existing control schemes rely on optical performance monitors (OPM) in the fiber link to detect changes in the signal power. A feedback loop can estimate the corrections required and adjust the EDFA amplifier gain/tilt and dynamic gain equalizers (DGE) that are present in the signal path. The DGE and OPM elements are only deployed in a small fraction of the nodes. The feedback loop involves communication between different nodes using an optical service channel (OSC) channel and is inherently slow. The feedback loop has settling time in the order of 10s to 100s of seconds.

As Raman amplifier deployments increase, fiber links will have more and more Raman amplifiers in-line. Thus, small changes due to transients will add up along fiber links. With the conventional feedback loops, these transients will take 10s to 100s of seconds to address which will lead to network events such as lines being declared down and mesh restored and the like. Accordingly, there is a need for Raman amplifier gain compression systems and methods based on signal power monitoring.

BRIEF SUMMARY OF THE INVENTION

In an exemplary embodiment, a Raman gain compression method includes measuring a first signal power at or near a launch point of at least one Raman pump into an optical fiber; measuring a second signal power at or near the launch point of the at least one Raman pump; computing an error in gain based on the first signal power and the second signal power; adjusting pump power of the at least one Raman pump based on the computed error; wherein the measuring steps, the computing step, and the adjusting step are each performed locally at a Raman amplifier including the at least one Raman pump. The Raman gain compression method can further include calculating, from initial calibration data, Raman pump efficiency of the at least one Raman pump; and adjusting the pump power of the at least one Raman pump based on the computed error times the Raman pump efficiency. The Raman gain compression method can further include calibrating an initial gain upon turn-up of the Raman amplifier; and initializing a feedback loop including the measuring steps, the computing step, and the adjusting step. The Raman gain compression method can further include performing the adjusting pump power of the at least one Raman pump based on the computed error when the computed error is above a predetermined threshold. The predetermined threshold can be indicative of transients affecting the Raman amplifier.

The Raman gain compression method can further include receiving a distributed measurement of Raman gain from another node; and adjusting an erbium doped fiber amplifier associated with the Raman amplifier based on the distributed measurement; wherein the receiving step and the adjusting step includes a slow response feedback loop; wherein the measuring steps, the computing step, and the adjusting step includes a fast response feedback loop; and wherein the slow response feedback loop is configured to compensate slow acting changes associated with the Raman amplifier and the fast response feedback loop is configured to compensate fast acting transients affecting with the Raman amplifier. The slow response feedback loop can operate on the order of 10 to 100 seconds and the fast response feedback loop can operate on the order of 100 microseconds. The Raman gain compression method can further include utilizing a feed forward control implementation adjusting a variable optical attenuator based on the computed error. The computed error in gain is $\Delta G$ and can be computed as:

$$\Delta G = -10 \cdot \text{LOG}_{10}\left(1 + \frac{P_1}{P_{sat}}\right) + 10 \cdot \text{LOG}_{10}\left(1 + \frac{P_2}{P_{sat}}\right)$$

with $P_1$ being the first signal power, $P_2$ being the second signal power, and $P_{sat}$ being a saturation power of the Raman amplifier. The saturation power, $P_{sat}$, can be predetermined based on curve fitting data related to the Raman amplifier. The measuring steps, the computing step, and the adjusting step can be performed without end-to-end or section-by-section coordination with other Raman amplifiers.

In another exemplary embodiment, a Raman amplifier includes at least one Raman pump; a power measuring device measuring signal power of the at least one Raman pump at or near a launch point into an optical fiber; and control circuitry including instructions that, when executed, cause the control circuitry to receive a measurement of a first signal power from the power measuring device; receive a measurement of a second signal power from the power measuring device; compute an error in gain based on the first signal power and the second signal power; send a command to adjust pump power of the at least one Raman pump based on the computed error; wherein the control circuit is configured to perform the receive steps, the compute step, and the send step locally to the Raman amplifier without external communication with devices outside the Raman amplifier. The instructions that, when executed, can further cause the control circuitry to calculate, from initial calibration data, Raman pump efficiency of the at least one Raman pump; and adjust the pump power of the at least one Raman pump based on the computed error times the Raman pump efficiency. The instructions that, when executed, can further cause the control circuitry to perform the adjusting pump power of the at least one Raman pump based on the computed error when the computed error is above a predetermined threshold. The predetermined threshold can be indicative of transients affecting the Raman amplifier.

The instructions that, when executed, can further cause the control circuitry to: receive a distributed measurement of Raman gain from another node; and cause an erbium doped fiber amplifier associated with the Raman amplifier to be adjusted based on the distributed measurement; wherein the receive step and the cause step includes a slow response feedback loop; wherein receive steps, the compute step, and the send step includes a fast response feedback loop; wherein the slow response feedback loop is configured to compensate slow acting changes associated with the Raman amplifier and the fast response feedback loop is configured to compensate fast acting transients affecting with the Raman amplifier; and wherein the slow response feedback loop operates on the order of 10 to 100 seconds and the fast response feedback loop operates on the order of 100 microseconds. The instructions that, when executed, can further cause the control circuitry to: utilize a feed forward control implementation adjusting a variable optical attenuator based on the computed error. The computed error in gain is ΔG and can be computed as:

$$\Delta G = -10 \cdot \text{LOG}_{10}\left(1 + \frac{P_1}{P_{sat}}\right) + 10 \cdot \text{LOG}_{10}\left(1 + \frac{P_2}{P_{sat}}\right)$$

with $P_1$ being the first signal power, $P_2$ being the second signal power, and $P_{sat}$ being a saturation power of the Raman amplifier. The saturation power, $P_{sat}$, can be predetermined based on curve fitting data related to the Raman amplifier.

In yet another exemplary embodiment, a control module includes control circuitry including instructions that, when executed, cause the control circuitry to receive a measurement of a first signal power from a power measuring device associated with a Raman amplifier; receive a measurement of a second signal power from the power measuring device; compute an error in gain based on the first signal power and the second signal power; send a command to adjust pump power of at least one Raman pump in the Raman amplifier based on the computed error; wherein the control circuitry is located within a Raman amplifier and is configured to implement a fast acting feedback loop capable of detecting and correcting transients affecting the Raman amplifier without communication outside of the Raman amplifier and on the order of 100 microseconds.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, Raman amplifier gain compression systems and methods based on signal power monitoring are described. Specifically, the systems and methods estimate distributed Raman amplifier saturation based on a total power measurement at the output of a distributed Raman amplifier and correct for any changes by adjusting the pump power. Since the power measurement, gain estimation, and the pump control are done locally at the Raman amplifier, the duration of any transients is minimized. In an exemplary embodiment, the systems and methods quickly detect transients on a fiber link using a power monitor in the Raman amplifier, estimate the change in gain due to change in input power from distributed Raman gain, and perform a feedback loop that corrects pump power to eliminate the change in Raman gain locally. Advantageously, the feedback loop has a response time on the order of 100 μs due to the delay from the propagation time of backward Raman pumps in the fiber link, but such response time is significantly lower than conventional systems and methods on the order of 10s to 100s of seconds. The response time advantageously prevents network events causing links to be declared problematic or down. In another exemplary embodiment, an alternate feed forward control scheme implementation is possible where the attenuation of a variable optical attenuator (VOA) is adjusted to compensate for the change in the Raman gain. The correction speed can be reduced to <1 μs with a fast VOA and this approach can potentially be implemented on other modules such as an EDFA where the VOA function is already present. The delay is only present in a backward Raman configuration. In a forward Raman configuration, any change in pump power is immediately reflected on the signal power. Also, a forward Raman pump will operate much deeper in saturation compared to a backward pump. The VOA based correction scheme may not work well for the forward pump configuration.

Figure 1:
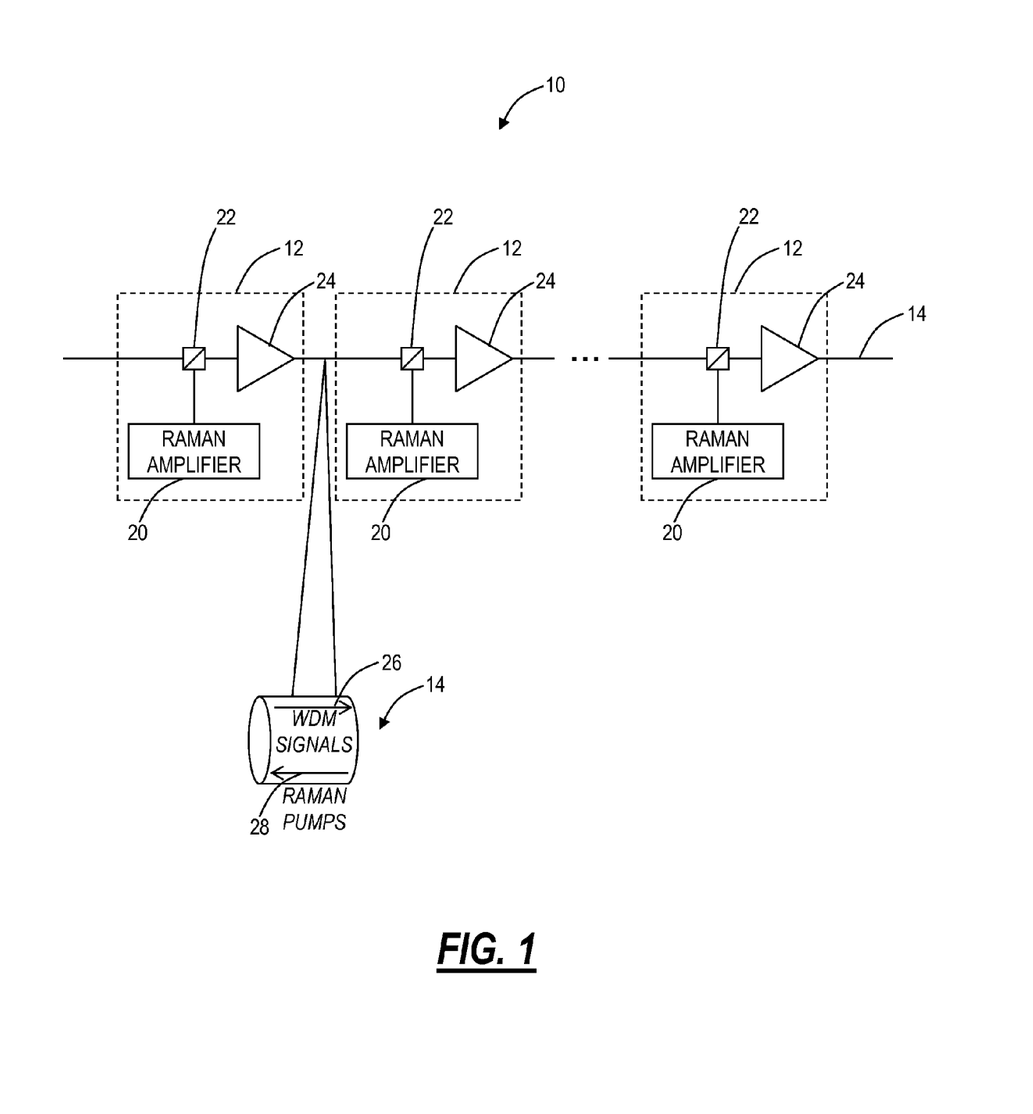
FIG. 1 is a network diagram of an exemplary fiber link with multiple amplifier nodes connected by an optical fiber.

Referring to FIG. 1, in an exemplary embodiment, a network diagram illustrates an exemplary fiber link 10 with multiple amplifier nodes 12 connected by an optical fiber 14. Each of the amplifier nodes 12 includes a Raman amplifier 20, a coupler 22 connecting the Raman amplifier 20 to the optical fiber 14, and an EDFA amplifier 24. It should be appreciated by those of ordinary skill in the art that FIG. 1 depicts the exemplary fiber link 10 in an oversimplified manner, and a practical embodiment can include additional components and suitably configured devices to support known or conventional operating features that are not described in detail herein. In this exemplary embodiment, wavelength division multiplexing (WDM) channels 26 propagate on the optical fiber 14 from right to left and Raman pump wavelengths 28 from the Raman amplifiers 20 propagate on the optical fiber 14 from left to right. Thus, the exemplary fiber link 10 includes counter-propagating or backward-propagating Raman amplifiers. In another exemplary embodiment, the Raman amplifiers 20 can provide the Raman pump wavelengths 28 in a co-propagating or forward-propagating manner with the WDM channels 26 as well as providing both counter- and co-propagating Raman pump wavelengths 28. The systems and methods described herein contemplate use with any distributed Raman amplifier.

As described herein, the fiber link 10 can include multiple nodes 12 such as 10s of nodes 12. In this context, variation of a couple of dBs for each of the Raman amplifiers 20 can be problematic if transients occur. The systems and methods contemplate the fiber link 10 utilizing conventional feedback mechanism that uses optical performance monitors (OPM) in the link 10 to detect changes in signal power. This can include a feedback loop that estimates the corrections required and adjusts the EDFA amplifier 24 gain/tilt and dynamic gain equalizers (DGE) that are present in the signal path over the optical fiber 14. The DGE and OPM elements are not shown in FIG. 1, but can be deployed at any of the nodes 12. As described herein, the feedback loop in the conventional feedback mechanism is slow acting, on the order of 10s to 100s, and can be used to accommodate slow changes in the fiber link 10 such as aging related issues for the various optical components. The systems and methods described herein are complementary to the conventional feedback mechanism and focus on fast acting transients such as a sudden change in number of channels (e.g., due to a failure or fault somewhere upstream in a network containing the fiber link 10). That is, the systems and methods seek to provide a fast acting feedback correction mechanism that is local to each of the Raman amplifiers 20 to reduce response time while simultaneously counteracting detected transients.

Figure 2:
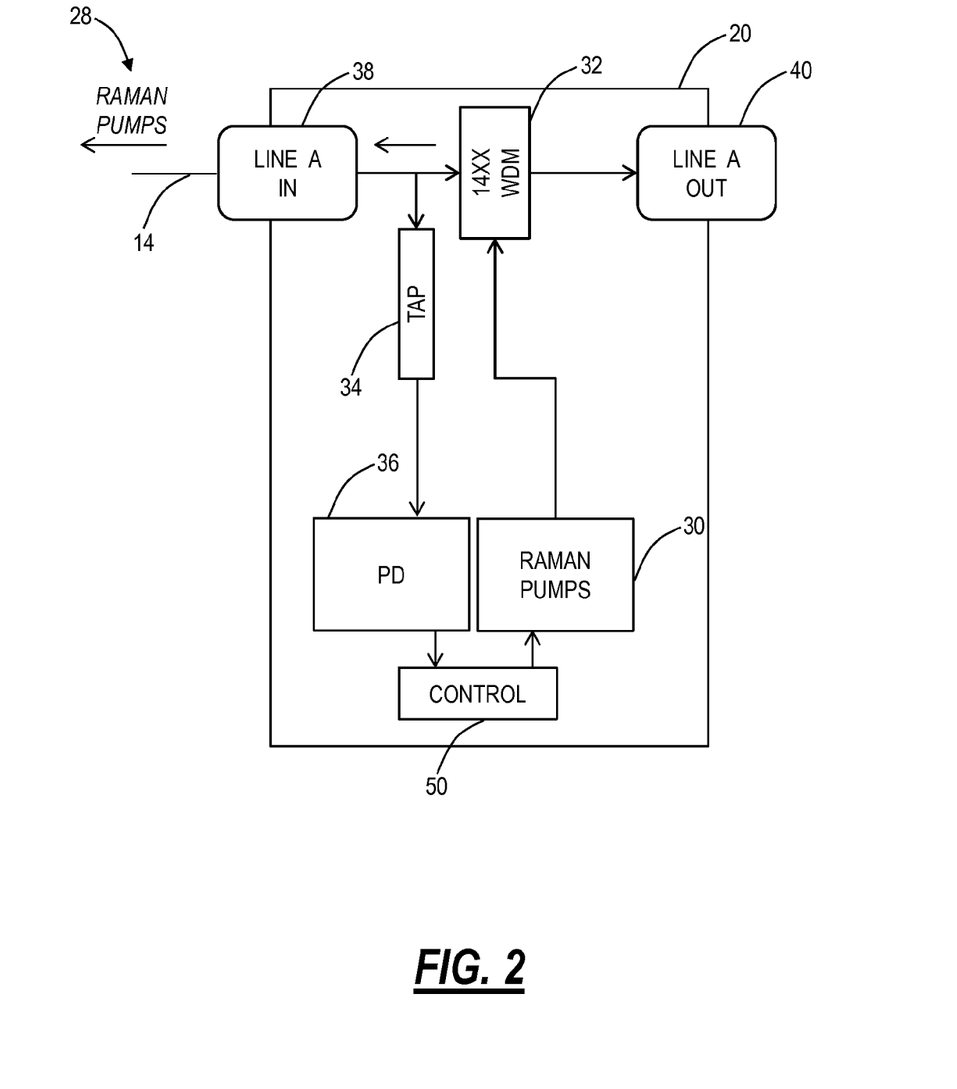
FIG. 2 is a block diagram of an exemplary implementation of a Raman amplifier.

Referring to FIG. 2, in an exemplary embodiment, a block diagram illustrates an exemplary implementation of the Raman amplifier 20. For illustration purposes, the Raman amplifier 20 includes counter-propagation by Raman pumps 30. Again, other types of propagation are also contemplated such as co-propagating or counter/co-propagating. Those of ordinary skill in the art will recognize that the Raman amplifier 20 is presented as an exemplary embodiment, and the systems and methods described herein contemplate use with any embodiment of a Raman amplifier. Also, it should be appreciated by those of ordinary skill in the art that the Raman amplifier 20 is depicted in an oversimplified manner, and a practical embodiment may include additional components and suitably configured processing logic to support known or conventional operating features that are not described in detail herein.

The Raman amplifier 20 includes one or more Raman pumps 30 coupled to a wavelength division multiplexing (WDM) filter 32. In operation, the Raman pumps 30 are configured to launch high power in the 1400-1500 nm range into the optical fiber 14 to create Raman gain for counter-propagating WDM channels 26 from an upstream node 12. Note, the WDM channels 26 can also include an OSC which can also receive the Raman gain. The Raman pumps 30 are coupled to the optical fiber 14 through the WDM filter 32 which connects to a line in port 38 and a line out port 40. A small power tap 34 (e.g., 1%, etc.) is coupled to the optical fiber 14 in the path of the Raman pumps 28 and is connected to a photodetector 36 which is configured to measure power of the Raman pumps 28 at or near the launch point (i.e., the line in port 38) into the optical fiber 14. Note, the tap 34 is illustrated connected between the line in port 38 and the WDM filter 32, but could also be placed anywhere as long as it is after the WDM filter 32 from the perspective of the Raman pumps 28.

In an exemplary embodiment for illustration purposes, the Raman pumps 30 can include four wavelengths at 1424 nm, 1434 nm, 1455 nm, and 1465 nm with about 250 mW per wavelength. Of course, other configurations are possible. This four wavelength exemplary embodiment will be used herein in the foregoing descriptions for illustration of the systems and methods. The Raman amplifier 20 includes a control block 50 that is communicatively coupled to the photodetector 36 and the Raman pumps 50. The control block 50 generally is a processing element configured to receive inputs (e.g., power measurements) from the photodetector 36 and provide outputs (e.g., pump power adjustments) to the Raman pumps 50. The control block 50 can include instructions executable by the control block 50 that, in response to such execution, cause the control block 50 or any other circuitry to perform a set of operations, steps, methods, processes, algorithms for Raman gain compression.

Figure 3:
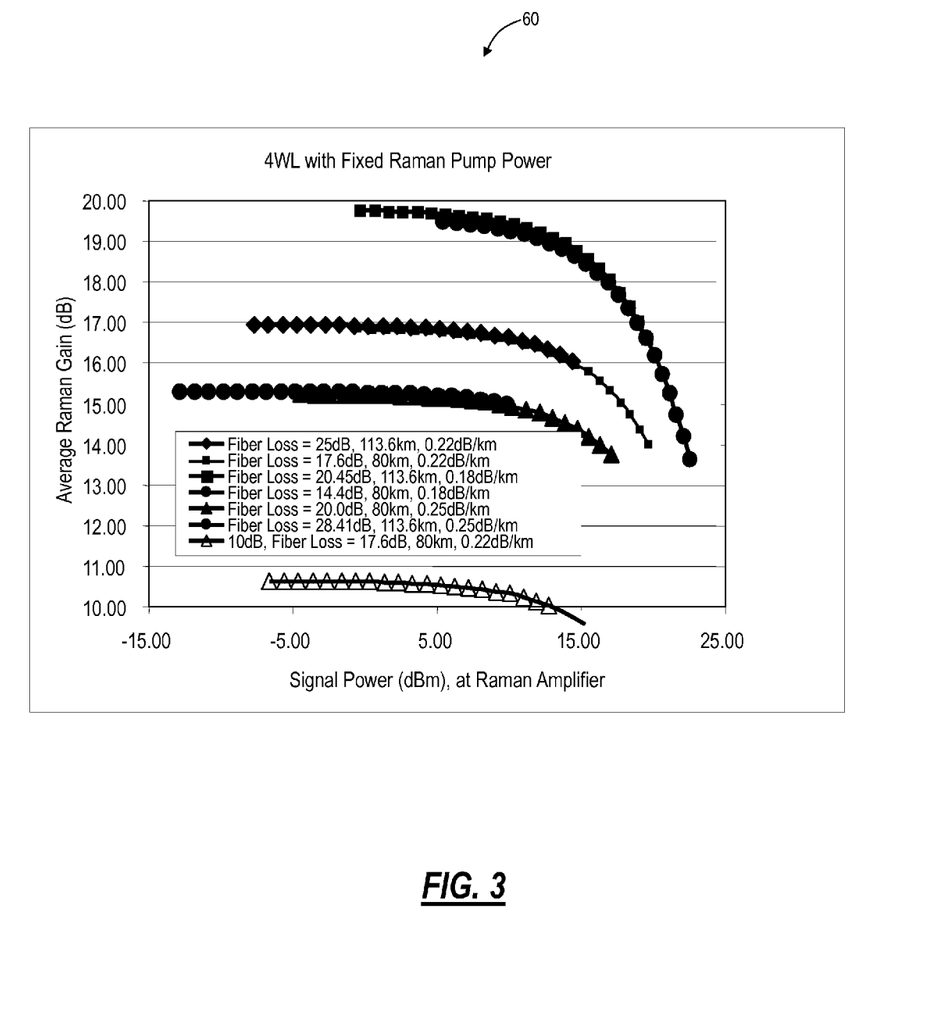
FIG. 3 is a graph of behavior of the distributed Raman Amplifier with four wavelengths for Raman pumps over various different optical fiber conditions.

Referring to FIG. 3, in an exemplary embodiment, a graph 60 illustrates behavior of the distributed Raman Amplifier 20 with the four wavelengths for the Raman pumps 30. The different curves in the graph 60 show distributed Raman gain in dB (the y-axis) plotted as a function of output power of the distributed Raman amplifier 20 (the x-axis). The output power of the distributed Raman amplifier 20 is typically where the Raman pumps 28 are injected into the optical fiber 14, i.e. at the line in port 38. The Raman gain experienced by the optical fiber 14 is a function of the total loss of the fiber and also the loss per unit length of the fiber. Also the amplifier 20 experiences compression as the input power into the amplifier 20 is increased.

Figure 4:
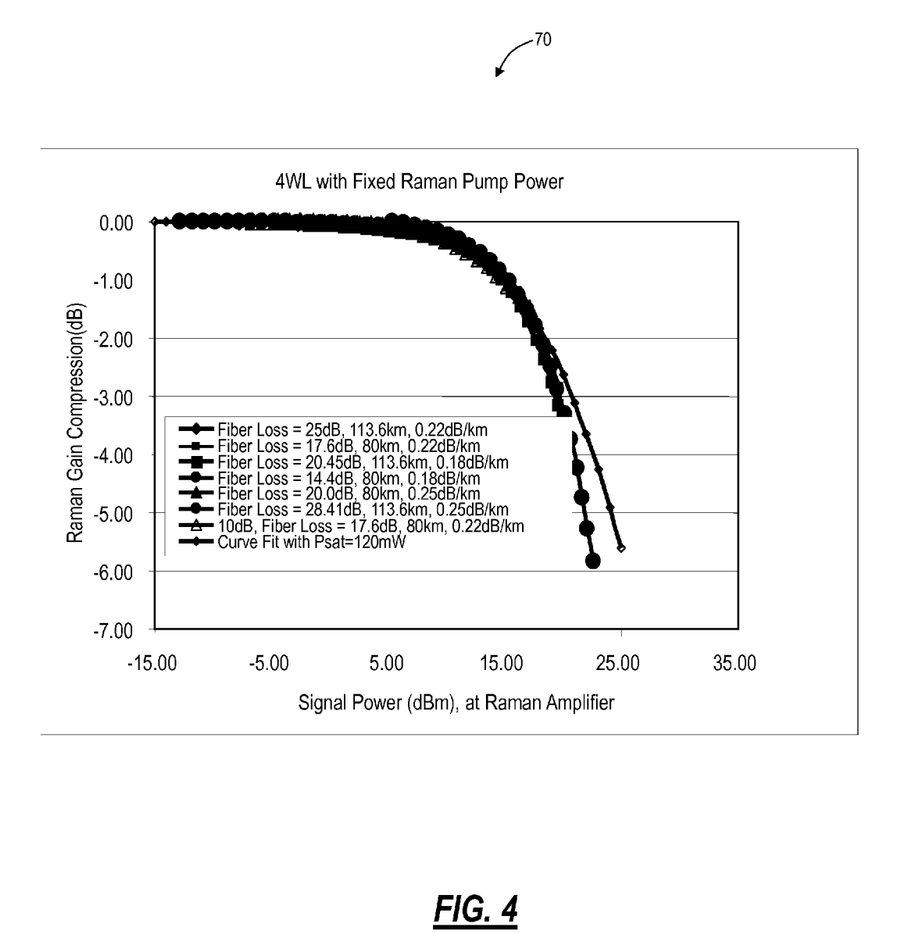
FIG. 4 is a graph of the same set of curves from the graph of FIG. 3 with all the gain values normalized to the small signal gain.

Referring to FIG. 4, in an exemplary embodiment, a graph 70 illustrates the same set of curves from the graph 60 with all the gain values normalized to the small signal gain. As seen between the graphs 60, 70, the variation on the y-axis is purely due to the gain saturation of the amplifier 20. The various curves collapse into a narrow range as shown in the graph 70. The graphs 60, 70 are based on experimentation and simulation based on fixed pump power of 1 W for 80 km and 113.6 km non-dispersion shifted fiber (NDSF) with fiber loss coefficients of 0.18 dB/km, 0.22 dB/km, and 0.25 dB/km and fixed pump power of 650 mW for 80 km NDSF fiber with a fiber loss coefficient of 0.22 dB/km. Based on this experimental observation, i.e. that the curves collapse into a narrow range, this allows the possibility of predicting the gain compression just based on the total power at the output of the amplifier.

A transient event causes a change in the output power of the amplifier 20 due to sudden change in number of channels, i.e. power as measured by the photodetector 36. Based on the observation that the Raman gain curves are fairly similar across different types of fibers and conditions as shown in the graphs 60, 70, transients can be detected by monitoring the total output power at the Raman Amplifier and any change in the gain compression due to the transient can be compensated with a feedback loop by adjusting the pump powers.

Based on the graph 70, it has been determined that Raman gain compression for the Raman amplifier 20 can be modeled by the following equations:

$$G = \frac{G_0}{1 + \frac{P}{P_{sat}}} \quad (1)$$

$$\Delta G_{dB} = -10 \cdot \text{LOG}_{10}\left(1 + \frac{P}{P_{sat}}\right) \quad (2)$$

$$\Delta G = -10 \cdot \text{LOG}_{10}\left(1 + \frac{P_1}{P_{sat}}\right) + 10 \cdot \text{LOG}_{10}\left(1 + \frac{P_2}{P_{sat}}\right) \quad (3)$$

Where $G_0$ is small signal gain, P is the total output signal power at the output of the Raman amplifier, $P_1$ and $P_2$ are each the total output signal power at the output of the Raman amplifier at times 1 and 2, $P_{sat}$ is the saturation power, $\Delta G_{dB}$ is the change from the small signal gain $G_0$, and $\Delta G$ is the change in Gain, G, where $P_1$ and $P_2$ are the initial and final power levels. The small signal gain, $G_o$, is the maximum gain of the Raman amplifier in the absence of saturation. The saturation power, $P_{sat}$, was determined based on curve fitting the data from the graphs 60, 70. Specifically, the gain saturation equation is a characteristic of any amplifier. However, after looking at various different fibers and conditions as shown in the graphs 60, 70, it was determined that the saturation power, $P_{sat}$, for a Raman amplifier could be obtained via curve fitting.

Figure 5:
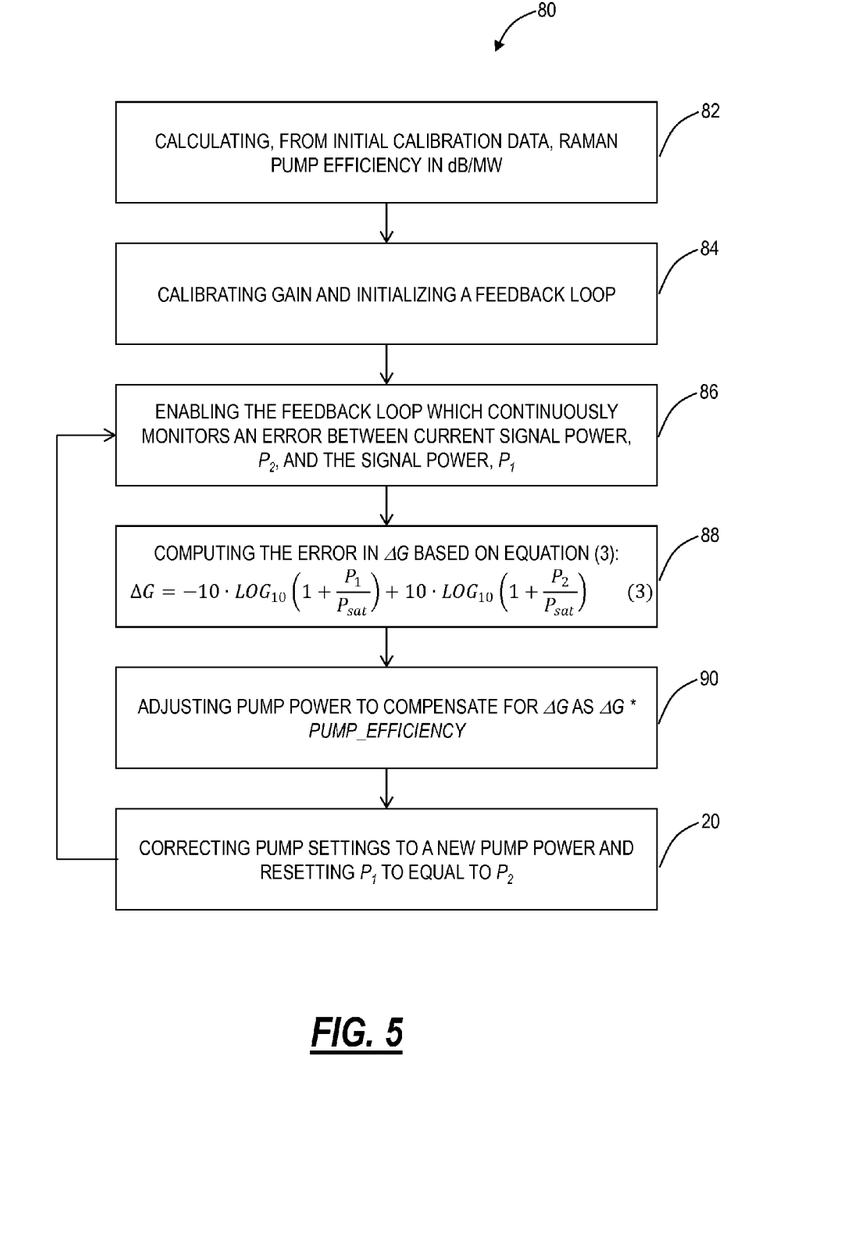
FIG. 5 is a flowchart of a Raman gain compression method for use in the Raman amplifier.

Referring to FIG. 5, in an exemplary embodiment, a flowchart illustrates a Raman gain compression method 80 for use in the Raman amplifier 20. In an exemplary embodiment, the Raman gain compression method 80 can be implemented by the control block 50 based on power measurement data from the photodetector 36 and pump adjustment data to the Raman pumps 30. The Raman gain compression method 80 has two stages: an initialization/calibration stage and then an operating feedback loop stage. First, the Raman gain compression method 80 includes calculating, from initial calibration data, Raman pump efficiency in dB/mW (step 82). The efficiency is a function of fiber type and to some extent fiber and fixed losses. The value is calibrated by initializing to Raman Gain/Total Pump Power.

Next, the Raman gain compression method 80 includes calibrating gain and initializing a feedback loop (step 84). The Gain value is known, and can be measured as $P_1$. The feedback loop is initialized at the value of signal power, $P_1$, at the Raman amplifier output at turn-up. The signal power, $P_1$, can be measured by the photodetector 36 at turn-up. Steps 82 and 84 represent the initialization/calibration stage. Once complete, the Raman gain compression method 80 includes enabling the feedback loop which continuously monitors an error between current signal power, $P_2$, and the signal power, $P_1$ (step 86). The error in input signal power is $\Delta P_{dB}$. The Raman gain compression method 80 includes computing the error in $\Delta G$ based on equation (3) (step 88):

$$\Delta G = -10 \cdot \text{LOG}_{10}\left(1 + \frac{P_1}{P_{sat}}\right) + 10 \cdot \text{LOG}_{10}\left(1 + \frac{P_2}{P_{sat}}\right). \quad (3)$$

The Raman gain compression method 80 includes adjusting pump power to compensate for $\Delta G$ as $\Delta G$*PUMP_EFFICIENCY (step 90). The Raman gain compression method 80 includes correcting pump settings to a new pump power and resetting $P_1$ to equal to $P_2$ (step 92). Finally, the Raman gain compression method 80 returns to step 86. In another exemplary embodiment, steps 90 and 92 can only be performed if the error in $\Delta G$ meets some predefined threshold.

As discussed herein, the Raman gain compression method 80 can be implemented in the Raman amplifier 20 locally without relying on external measurements, communication, etc. Advantageously, a benefit of this approach is that it minimizes the transients on surviving channels where is a large change in the aggregate signal power due to a fiber cut or other failure. Since the control scheme is local to every Raman amplifier 20, the correction is done relatively fast and without any end to end or section by section co-ordination.

Figure 6:
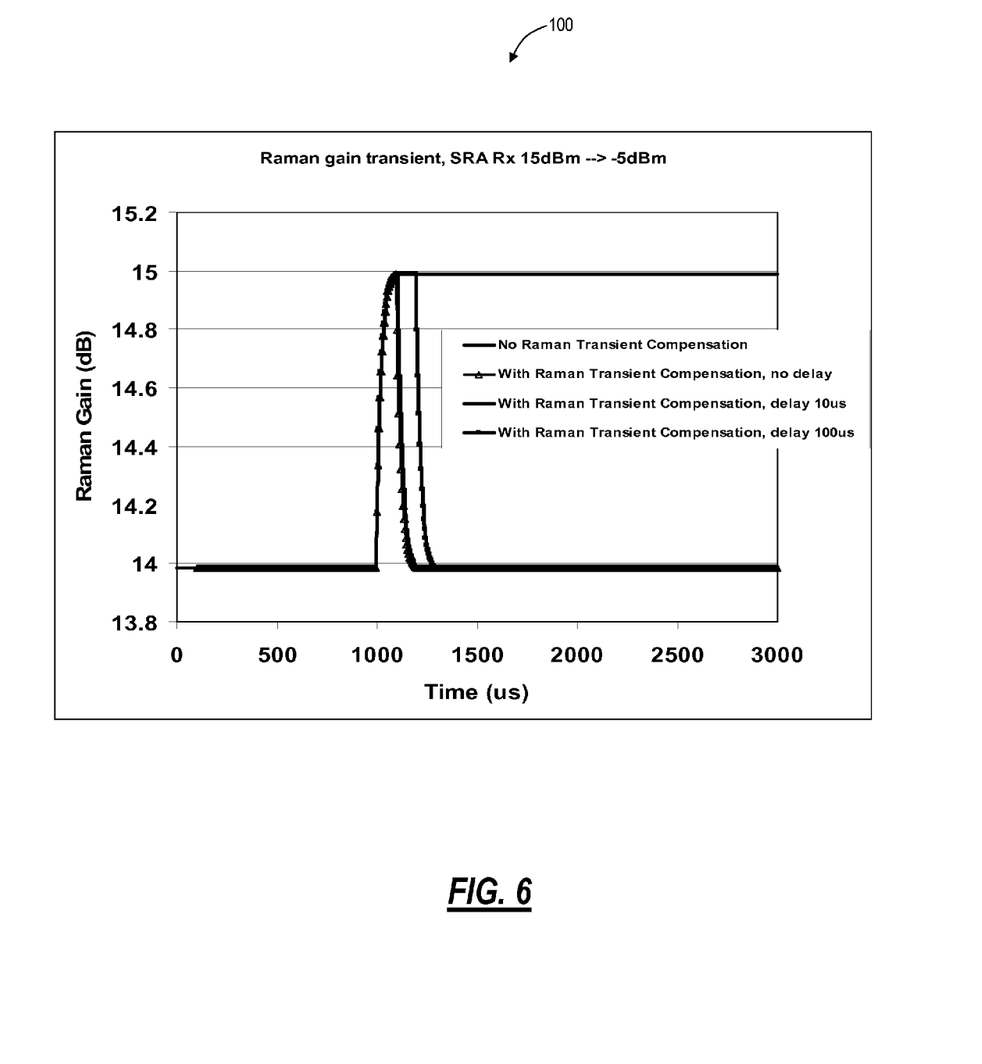
FIG. 6 is a graph of an exemplary transient in a Raman amplifier with and without implementing the Raman gain compression method of FIG. 5.

Referring to FIG. 6, in an exemplary embodiment, a graph 100 shows an exemplary transient in the Raman amplifier 20 with and without implementing the Raman gain compression method 80. Specifically, the graph 100 plots Raman gain (dB) over time. At 1000 µs, the graph 100 shows a transient such as a loss in channels which causes the Raman gain to go from about 14 dB to 15 dB. The Raman gain compression is about 1 dB for 15 dB Raman gain for a change in the output signal power from 15 dBm to −5 dBm. Without the Raman gain compression method 80, the Raman amplifier continues to operate at 15 dB of Raman gain which as described herein can be problematic when considered in conjunction with multiple Raman amplifiers in a fiber link. With the Raman gain compression method 80, compensation of the gain error due to change in gain compression is corrected within 100 µs. The 100 µs overshoot was Raman amplifier inherent time constant of Raman pumps power through ~20 km effective length to build up the Raman gain. A feed forward loop using a VOA can be used if faster correction times are required beyond 100 µs. The delay is characteristic only for a backward propagating pump. A forward pump does not have this fundamental limit on the delay.

With respect to the Raman amplifier 20, the control block 50, and the Raman gain compression method 80, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A Raman gain compression method, comprising:
measuring a first signal power at or near a launch point of at least one Raman pump into an optical fiber;
measuring a second signal power at or near the launch point of the at least one Raman pump;
computing an error in gain based on the first signal power and the second signal power;
calculating, from initial calibration data, Raman pump efficiency of the at least one Raman pump; and
adjusting pump power of the at least one Raman pump based on a product of the computed error and the Raman pump efficiency;
wherein the measuring steps, the computing step, and the adjusting step are each performed locally at a Raman amplifier comprising the at least one Raman pump.

2. The Raman gain compression method of claim 1, further comprising:
calibrating an initial gain upon turn-up of the Raman amplifier; and
initializing a feedback loop comprising the measuring steps, the computing step, and the adjusting step.

3. The Raman gain compression method of claim 1, further comprising:
performing the adjusting pump power of the at least one Raman pump based on the computed error when the computed error is above a predetermined threshold.

4. The Raman gain compression method of claim 3, wherein the predetermined threshold is indicative of transients affecting the Raman amplifier.

5. The Raman gain compression method of claim 1, further comprising:
receiving a distributed measurement of Raman gain from another node; and
adjusting an erbium doped fiber amplifier associated with the Raman amplifier based on the distributed measurement;
wherein the receiving step and the adjusting step comprise a slow response feedback loop;
wherein the measuring steps, the computing step, and the adjusting step comprise a fast response feedback loop; and
wherein the slow response feedback loop is configured to compensate slow acting changes associated with the Raman amplifier and the fast response feedback loop is configured to compensate fast acting transients affecting with the Raman amplifier.

6. The Raman gain compression method of claim 1, further comprising:
utilizing a feed forward control implementation adjusting a variable optical attenuator based on the computed error.

7. The Raman gain compression method of claim 6, wherein the slow response feedback loop operates on the order of 10 to 100 seconds and the fast response feedback loop operates on the order of 100 microseconds.

8. The Raman gain compression method of claim 1, wherein the computed error in gain comprises AG and is computed as:

$$\Delta G = -10 \cdot \text{LOG}_{10}\left(1 + \frac{P_1}{P_{sat}}\right) + 10 \cdot \text{LOG}_{10}\left(1 + \frac{P_2}{P_{sat}}\right)$$

with $P_1$ being the first signal power, $P_2$ being the second signal power, and $P_{sat}$ being a saturation power of the Raman amplifier.

9. The Raman gain compression method of claim 8, wherein the saturation power, $P_{sat}$, is predetermined based on curve fitting data related to the Raman amplifier.

10. The Raman gain compression method of claim 1, wherein the measuring steps, the computing step, and the adjusting step are performed without end-to-end or section-by-section coordination with other Raman amplifiers.

11. A Raman amplifier, comprising:
at least one Raman pump;
a power measuring device configured to measure signal power of the at least one Raman pump at or near a launch point into an optical fiber; and
control circuitry comprising instructions that, when executed, cause the control circuitry to:
receive a measurement of a first signal power from the power measuring device;
receive a measurement of a second signal power from the power measuring device;
compute an error in gain based on the first signal power and the second signal power;
calculate, from initial calibration data, Raman pump efficiency of the at least one Raman pump; and
send a command to adjust pump power of the at least one Raman pump based on a product of the computed error and the Raman pump efficiency;
wherein the control circuit is configured to perform the receive steps, the compute step, the calculate step, and the send step locally to the Raman amplifier without external communication with devices outside the Raman amplifier.

12. The Raman amplifier of claim 11, wherein the instructions that, when executed, further cause the control circuitry to:
perform the adjusting pump power of the at least one Raman pump based on the computed error when the computed error is above a predetermined threshold.

13. The Raman amplifier of claim 12, wherein the predetermined threshold is indicative of transients affecting the Raman amplifier.

14. The Raman amplifier of claim 11, wherein the instructions that, when executed, further cause the control circuitry to:
receive a distributed measurement of Raman gain from another node; and
cause an erbium doped fiber amplifier associated with the Raman amplifier to be adjusted based on the distributed measurement;
wherein the receive step and the cause step comprise a slow response feedback loop;
wherein receive steps, the compute step, and the send step comprise a fast response feedback loop;
wherein the slow response feedback loop is configured to compensate slow acting changes associated with the Raman amplifier and the fast response feedback loop is configured to compensate fast acting transients affecting with the Raman amplifier; and wherein the slow response feedback loop operates on the order of 10 to 100 seconds and the fast response feedback loop operates on the order of 100 microseconds.

15. The Raman amplifier of claim 11, wherein the instructions that, when executed, further cause the control circuitry to:
utilizing a feed forward control implementation adjusting a variable optical attenuator based on the computed error.

16. The Raman amplifier of claim 11, wherein the computed error in gain comprises $\Delta G$ and is computed as:

$$\Delta G = -10 \cdot \text{LOG}_{10}\left(1 + \frac{P_1}{P_{sat}}\right) + 10 \cdot \text{LOG}_{10}\left(1 + \frac{P_2}{P_{sat}}\right)$$

with $P_1$ being the first signal power, $P_2$ being the second signal power, and $P_{sat}$ being a saturation power of the Raman amplifier.

17. The Raman amplifier of claim 16, wherein the saturation power, $P_{sat}$, is predetermined based on curve fitting data related to the Raman amplifier.

18. A control module, comprising:
control circuitry comprising instructions that, when executed, cause the control circuitry to:
receive a measurement of a first signal power from a power measuring device associated with a Raman amplifier;
receive a measurement of a second signal power from the power measuring device;
compute an error in gain based on the first signal power and the second signal power;
calculate, from initial calibration data, Raman pump efficiency of at least one Raman pump; and
send a command to adjust pump power of the at least one Raman pump based on a product of the computed error and the Raman pump efficiency;
wherein the control circuitry is located within a Raman amplifier and is configured to implement a fast acting feedback loop capable of detecting and correcting transients affecting the Raman amplifier without communication outside of the Raman amplifier and on the order of 100 microseconds.

* * * * *